3,324,983
OUTPUT SPEED CONTROL SYSTEM FOR A VARIABLE CAPACITY FRICTION CLUTCH
Joseph B. Snoy and Basil White, Rockford, Ill., assignors to Twin Disc Clutch Company, Rockford, Ill., a corporation of Wisconsin
Filed May 10, 1965, Ser. No. 454,481
6 Claims. (Cl. 192—85)

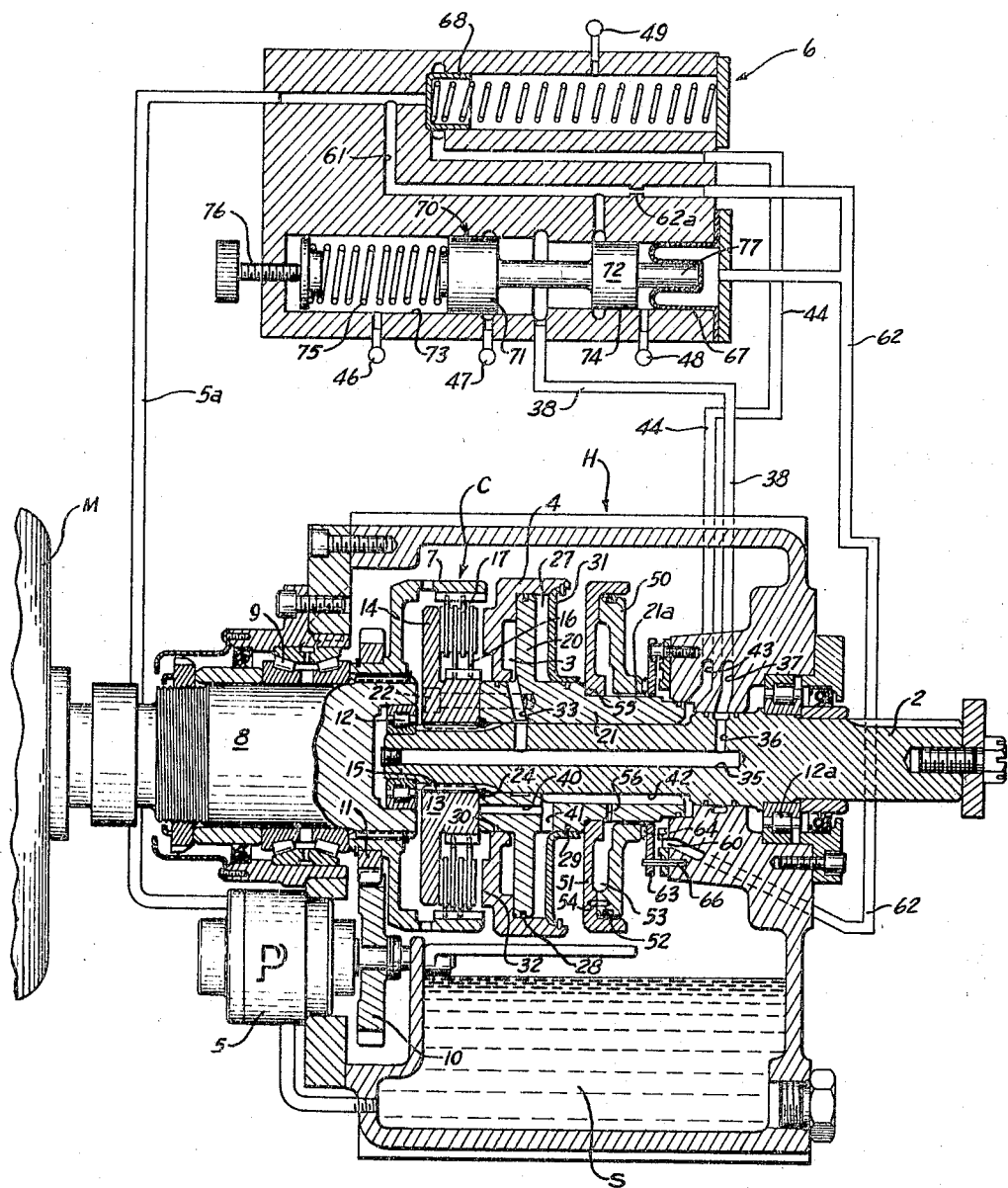

ABSTRACT OF THE DISCLOSURE

A hydraulically actuated friction clutch including speed sensing means responsive to output speed of the clutch for control thereof.

---

The present invention relates to speed control mechanism for a friction clutch.

It is an object of the present invention to provide a control mechanism for automatically controlling and maintaining the output speed of a variable capacity friction clutch at a predetermined value.

A more specific aspect of the invention relates to a control mechanism of the above type having a speed sensing means which is responsive to speed of the clutch output, which means actuates a fluid control valve, which valve in turn regulates the intensity of clutch engagement and consequently output speed.

By means of the present invention, any selected output speed of the clutch can be maintained constant.

These and other objects and advantages will appear hereinafter as this disclosure progresses, reference being had to the accompanying drawings, in which is shown a longitudinal, cross-sectional view through a clutch embodying the present invention and showing certain parts of the mechanism in more or less schematic form.

Generally, an essentially constant speed electric motor drives the output shaft 2 of a variable capacity, friction clutch C. The capacity of the clutch is determined by pressure fluid acting in chamber 3 on a clutch piston 4. Fluid is supplied from the sump S by the fluid pump 5 through a control valve 6 which valve acts to maintain the fluid pressure at a constant value. This constant pressure may be held at about 100 p.s.i. for this system. The shaft 2 is normally connected to a load to be driven at various selected speeds.

More specifically, the clutch includes a driven cup 7 which is secured to a shaft 8 that is driven by motor M and is suitably journalled by bearing assembly 9 in the housing H. The fluid pump 5 is mounted in the housing and its gear 10 is driven by a constantly meshing gear 11 fixed to shaft 8. The pump supplies high pressure fluid to the valve 6 via conduit 5a.

The output shaft 2 at one end is piloted by anti-friction bearing assembly 12 in the end of the co-axial shaft 8. The shaft 2 is also journalled in the housing H by the anti-friction bearing assembly 12a. A clutch hub 13 including a back-up plate 14 is fixed to shaft 2 by a splined connection 15 for rotation with the shaft. The hub 13 and cup 7 are connectable together in the conventional manner by the interleaved clutch plates 16 and 17 which are axially slidable thereon, respectively, by the conventional spline connections as shown.

A fluid operated means in the form of a cylinder and piston means is mounted on the output member and is provided for activating the clutch as follows. A reaction member 20 is also fixed to shaft 2 for rotation therewith, more particularly, the member 20 has an integral sleeve 21 which is mounted on the shaft and is fixed to hub 13 by cap bolts 22. The hub and the sleeve and its reaction member have been shown as being separate parts and such facilitates manufacturing thereof. Nevertheless, the hub and the reaction member could be made from one piece, it only being necessary that they rotate together with the shaft as a single unit. A snap ring 24 holds the unit axially fixed on the shaft.

The annular housing 4 is slidably mounted on sleeve 21 and encloses the axially fixed reaction member 20 to define therewith clutch actuating chamber 3 and a clutch release chamber 27. A suitable O-ring fluid seal 28 is located between member 20 and the housing, and seals 29 and 30 act to provide a fluid, sliding seal between the end walls 31 and 32 of the housing. The housing constitutes a clutch actuating piston, and end wall 32 is adapted to clamp up the clutch plates in the known manner when chamber 3 is pressurized. The capacity of the clutch is determined by the pressure acting on the clutch piston 4.

Pressure fluid is admitted to chamber 3 through the aligned radial port 33, rifle drilling 35 in shaft 2, cross port 36, passage 37 in the housing H and conduit 38 which is in fluid communication with the control valve 6, to be described.

Lubricating and cooling fluid is admitted to chamber 27 and to the clutch plates 16 and 17 via passages 40, 41, 42, 43 and conduit 44, which conduit is also in fluid communication with valve 6. This lubricating fluid is also used to charge a speed sensing piston, now to be described.

Ports 46, 47, 48 and 49 in the valve are connected to the sump S which is formed as a part of the housing. It should be noted that the entire system is formed as a compact, integral package.

Speed sensing means

Means are provided to sense the output speed and which is responsive to this output speed. This means may take various forms, such as a flexible diaphragm loaded with a centrifugal fluid head, as will appear, or it may be a mechanical means such as a fly weight arrangement. The invention is described here, however, as using a cylinder and piston means, as follows.

A speed sensing cylinder and pistons means is mounted on the output member for rotation therewith, as follows. A piston 50 is mounted in a cylinder 51 which in turn is mounted on sleeve 21 and an O-ring seal 52 is located around the periphery of the piston to form a fluid seal for chamber 53. A pin 54 in the piston and cylinder prevents relative rotation therebetween. The cylinder is prevented from axial movement in one direction by a shoulder 55 which is formed by the reduced portion 21a of sleeve 21 and the piston 50 can move axially in the other direction (to the right as viewed in the drawing) due to the centrifugal fluid head developed in chamber 53 by lubricating fluid which enters the chamber via port 56.

The cylinder 51 and the piston 50 rotate with the output shaft 2, carrying the fluid in chamber 53, and the centrifugal head developed by the fluid creates an axial thrust, forcing the piston to the right (as viewed in the drawing). The amount of axial thrust of the piston increases with and is proportional to the speed of the output shaft 2.

A means are provided for connecting the speed sensing cylinder and piston to the control valve as follows:

An annular groove 60 is formed in the interior of the housing and is supplied with fluid from the high pressure passage 61 of the valve 6 by means of the speed sensing conduit or passageway 62 therebetween. An orifice 62a is located in the passageway 62 and restricts the amount of fluid but not the pressure thereof from entering this passageway. A valve plate 63 is adapted to abut against and thereby close the groove 60 and permit pressure to be built up in the groove. If the plate valve 63 is off the groove 60, then fluid simply dumps to the sump and the orifice 62a serves to prevent a large quantity of fluid from being dumped. Thus the groove 60 forms a fluid outlet for the passageway means 62. The piston 50, acting through the intermediate needle bearing assembly 64, forces the valve plate against the groove as the centrifugal head in chamber 53 is developed by rotation of the chamber. The plate is prevented from rotating with the piston by the pin 66 which extends from the housing and on which the valve plate is axially slidable; the needle bearing assembly permits relative rotation between the piston 50 and valve plate.

Thus the pressure that will exist in the annular groove 60 is determined by the force on the valve plate developed by the centrifugal fluid head acting on the piston 50. The force of the piston acting on the valve plate increases with the speed of the output shaft 2 and the fluid pressure in the annular groove is regulated to a value that increases with the speed of shaft 2. This same pressure is admitted behind a fluid control means in the form of a diaphragm 67 via conduit 62.

The control valve 6 is in communication with the pump and the fluid operated cylinder and piston means for operating the clutch, and this valve serves to selectively permit and prevent the flow of pressure fluid to operate the clutch.

Turning now to a more detailed description of this modulating valve 6, the high pressure fluid that is delivered by the pump 5 to the valve 6 is regulated to a constant value by a spring loaded valve element 68 which permits pressure fluid over a predetermined pressure to by-pass via passage or conduit 44.

As previously mentioned, conduit 44 directs this excess fluid to cool the clutch and charge chamber 53 behind the speed sensing piston. Chamber 53 is kept full of fluid but is not pressurized.

The valve includes a shiftable spool 70 having lands 71 and 72 which are slidable, respectively, in bores 73 and 74. It should be noted that land 71 is of larger diameter than land 72, for a purpose that will appear later. The spool is biased to the right (as viewed in the drawing) by a spring 75, which spring in turn is loaded by an adjusting screw means 76. As will appear, the screw means 76 is for the purpose of selecting the speed of rotation of the output shaft 2.

The other end of the spool has a projection 77 which bears against the diaphragm and is located on the opposite thereof from that against which the speed sensing pressure bears.

The valve spool 70 is shown in the neutral position in which no fluid is admitted via conduit 38 to engage the clutch and the output shaft does not rotate.

*Operation*

When the speed sensing pressure on the diaphragm 67, as determined by that in annular groove 60, falls sufficiently to permit spring 75 to push the spool 70 to the right (as viewed in the drawing), pressure fluid is directed via conduit 38 to the clutch actuating chamber 3. This causes clutch engagement and rotation of the output shaft.

As the output shaft begins to rotate, a pressure is developed behind the diaphragm that increases with shaft speed. When this speed reaches a predetermined value as set by adjusting screw 76, the pressure behind the diaphragm forces the spool valve to the left against the bias of spring 75 and thereby cuts off flow of pressure fluid to the clutch apply chamber 3.

For any given setting of the spring 75 which biases the spool to the right to permit pressure fluid to engage the clutch, there is an output shaft speed which produces sufficient centrifugal head in the speed sensing chamber 50 to close the plate valve 63 and permit sufficient pressure to be built up behind the diaphragm to shift the spool to the left. This shifting of the spool to the left against the spring bias cuts off flow of pressure fluid to the clutch, thus reducing its capacity and slowing the speed of the shaft.

To provide "stability" in the system, a certain "droop" is introduced by making the left hand land 71 of the spool valve slightly larger than the right hand land 72, as previously mentioned.

The output shaft speed is in this manner controlled by the state of equilibrium or balance between the spring and output shaft speed.

Various modes of carrying out the invention are contemplated as being within the scope of the following claims particularly pointing out and distinctly claiming the subject matter which is regarded as the invention.

We claim:

1. A control system comprising, a variable capacity friction clutch having a drive input member and a driven output member, a fluid cylinder and piston means for actuating said clutch, a fluid pump for supplying pressure fluid to said cylinder and piston means, a control valve between said pump and cylinder and piston means for selectively permitting and preventing the flow of pressure fluid thereto for operation thereof, and a rotatable speed sensing means connected by means other than said clutch for rotation with said output member and responsive to rotational speed of the output shaft, said speed sensing means being connected with said control valve for operation thereof, the rotation of said output member above a predetermined value causing actuation of said speed sensing means and consequent shifting of said control valve and disengagement of said clutch.

2. An output speed control system for a variable capacity friction clutch comprising, a drive input member, a driven output member, a friction clutch engageable between said input and output members, fluid operated means for actuating said clutch, a source of pressure fluid, a control valve in fluid communication with said source and with said fluid operated means for selectively admitting and preventing the flow of pressure fluid to said fluid operated means for operation thereof; said control valve including a shiftable valve element, adjustable means for resiliently biasing said element to a clutch apply position, and fluid control means for urging said element toward a clutch disengaged position; passageway means in fluid communication with both of said fluid control means and said fluid source and having an outlet whereby fluid pressure is furnished to said control means when said outlet is blocked, a rotatable speed sensing means connected with said output member for rotation therewith and shiftable to block said outlet, said speed sensing means being responsive to rotational speed of said output member, said speed when of a predetermined value causing shifting of said means to block said outlet and consequent shifting of said valve element toward said clutch disengaged position.

3. A control system for a variable capacity friction clutch comprising, a drive input member, a driven output member for being driven at a constant but adjustable speed, a friction clutch located between said input and output members and engageable to cause said input member to drive said output member, a fluid operated cylinder and piston mounted on said output member for actuating said clutch, a fluid pump for supplying pressure fluid, a control valve in fluid communication with said pump and with said cylinder for selectively permitting and preventing the flow of pressure fluid to said cylinder, said control valve including a shiftable spool valve element, adjustable spring means for resiliently biasing said element to a clutch apply position, and a pressurizable diaphragm having one side in contact with and for urging said element against said spring means toward a clutch disengaged position, passageway means in fluid communication with the other side of said diaphragm and also with said pump, said passageway means having an outlet for dumping pressure fluid therefrom and whereby fluid pressure is built up against said diaphragm when said outlet is blocked, a rotatable speed sensing means connected with said output member for rotation therewith and shiftable to block said outlet, said sensing means being responsive to rotational speed of said output shaft and shiftable when said output speed reaches a predetermined value and thereby blocks said outlet and consequently causes said diaphragm to shift said valve element and disengage said clutch.

4. A control system comprising, a variable capacity friction clutch having a drive input member and a driven output member, a fluid cylinder and piston means for actuating said clutch, a fluid pump for supplying pressure fluid to said cylinder and piston means, a control valve between said pump and cylinder and piston means for selectively permitting and preventing the flow of pressure fluid thereto for operation thereof, and a rotatable speed sensing cylinder and piston means connected by means other than said clutch for rotation with said output member and chargeable with fluid whereby a centrifugal head can be built up therein which is proportional to rotational speed of the output shaft, said speed sensing cylinder and piston means being connected with said control valve for operation thereof, said head when of a predetermined value causing actuation of said speed sensing cylinder and piston means and consequent shifting of said control valve and disengagement of said clutch.

5. An output speed control system for a variable capacity friction clutch comprising, a drive input member, a driven output member, a friction clutch engageable between said input and output members, fluid operated means for actuating said clutch, a source of pressure fluid, a control valve in fluid communication with said source and with said fluid operated means for selectively admitting and preventing the flow of pressure fluid to said fluid operated means for operation thereof; said control valve including a shiftable valve element, adjustable means for resiliently biasing said element to a clutch apply position, and fluid control means for urging said element toward a clutch disengaged position; passageway means in fluid communication with both of said fluid control means and said fluid source and having an outlet whereby fluid pressure is furnished to said control means when said outlet is blocked, a rotatable speed sensing cylinder and piston means connected with said output member for rotation therewith and shiftable to block said outlet, said cylinder and piston means adapted to be charged with fluid whereby a centrifugal head can be built up therein which is proportional to rotational speed of said output member, said head when of a predetermined value causing shifting of said cylinder and piston means to block said outlet and consequent shifting of said valve element toward said clutch disengaged position.

6. A control system for a variable capacity friction clutch comprising, a drive input member, a driven output member for being driven at a constant but adjustable speed, a friction clutch located between said input and output members and engageable to cause said input member to drive said output member, a fluid operated cylinder and piston mounted on said output member for actuating said clutch, a fluid pump for supplying pressure fluid, a control valve in fluid communication with said pump and with said cylinder for selectively permitting and preventing the flow of pressure fluid to said cylinder, said control valve including a shiftable spool valve element, adjustable spring means for resiliently biasing said element to a clutch apply position, and a pressurizable diaphragm having one side in contact with and for urging said element against said spring means toward a clutch disengaged position, passageway means in fluid communication with the other side of said diaphragm and also with said pump, said passageway means having an outlet for dumping pressure fluid therefrom and whereby fluid pressure is built up against said diaphragm when said outlet is blocked, a rotatable speed sensing cylinder and piston means connected with said output member for rotation therewith and shiftable to block said outlet, means for charging said cylinder and piston means with fluid whereby a centrifugal head can be built up therein which is proportional to rotational speed of said output shaft, said cylinder and piston means adapted to shift when said head reaches a predetermined value to block said outlet and consequently cause said diaphragm to shift said valve element and disengage said clutch.

References Cited
UNITED STATES PATENTS

| | | | |
|---|---|---|---|
| 1,137,944 | 5/1915 | Allen | 192—104 X |
| 2,297,480 | 9/1942 | Kratzmann | 192—104 X |
| 2,642,972 | 6/1953 | Brooks | 192—85 X |
| 3,155,040 | 11/1964 | Shurts et al. | 192—85 X |

BENJAMIN W. WYCHE III, *Primary Examiner.*